United States Patent
Chan et al.

(10) Patent No.: US 7,996,353 B2
(45) Date of Patent: Aug. 9, 2011

(54) POLICY-BASED MANAGEMENT SYSTEM WITH AUTOMATIC POLICY SELECTION AND CREATION CAPABILITIES BY USING SINGULAR VALUE DECOMPOSITION TECHNIQUE

(75) Inventors: Hoi Y. Chan, New Canaan, CT (US); David M. Chess, Mohegan Lake, NY (US); Thomas Y. Kwok, Washington Township, NJ (US); Steve R. White, New York, NY (US)

(73) Assignee: International Business Machines Corporation, Armonk, NY (US)

(*) Notice: Subject to any disclaimer, the term of this patent is extended or adjusted under 35 U.S.C. 154(b) by 369 days.

(21) Appl. No.: 12/131,424

(22) Filed: Jun. 2, 2008

(65) Prior Publication Data

US 2008/0235168 A1     Sep. 25, 2008

Related U.S. Application Data

(63) Continuation of application No. 11/446,761, filed on Jun. 5, 2006, now abandoned.

(51) Int. Cl.
*G06N 5/00* (2006.01)
(52) U.S. Cl. ........................................... 706/48
(58) Field of Classification Search ............... 706/45, 706/48
See application file for complete search history.

(56) References Cited

U.S. PATENT DOCUMENTS

| | | | |
|---|---|---|---|
| 5,675,819 A | 10/1997 | Schuetze | |
| 6,560,597 B1 | 5/2003 | Dhillon et al. | |
| 6,611,825 B1 | 8/2003 | Billheimer et al. | |
| 6,701,305 B1 | 3/2004 | Holt et al. | |
| 6,792,456 B1 | 9/2004 | Hellerstein et al. | |
| 2004/0059966 A1 | 3/2004 | Chan et al. | |
| 2004/0178951 A1 | 9/2004 | Ponsford et al. | |
| 2004/0243692 A1* | 12/2004 | Arnold et al. | 709/220 |
| 2004/0243699 A1 | 12/2004 | Koclanes et al. | |
| 2005/0091356 A1 | 4/2005 | Izzo | |
| 2005/0256947 A1 | 11/2005 | Devarakonda et al. | |

(Continued)

OTHER PUBLICATIONS

J.O. Kephart and D.M. Chess entitled The Vision of Autonomic Computing. IEEE Computer Magazine, Jan. 2003.

(Continued)

*Primary Examiner* — Jeffrey A Gaffin
*Assistant Examiner* — Mai T Tran
(74) *Attorney, Agent, or Firm* — Scully, Scott, Murphy & Presser, P.C.; Stephen C. Kaufman, Esq.

(57) ABSTRACT

A statistical approach implementing Singular Value Decomposition (SVD) to a policy-based management system for autonomic and on-demand computing applications. The statistical approach empowers a class of applications that require policies to handle ambiguous conditions and allow the system to "evolve" in response to changing operation and environment conditions. In the system and method providing the statistical approach, observed event-policy associated data, which is represented by an event-policy matrix, is treated as a statistical problem with the assumption that there are some underlying or implicit higher order correlations among events and policies. The SVD approach enables such correlations to be modeled, extracted and modified. From these correlations, recommended policies can be selected or created without exact match of policy conditions. With a feedback mechanism, new knowledge can be acquired as new situations occur and the corresponding policies to manage them are recorded and used to generate new event and policy correlations. Consequently, based on these new correlations, new recommended policies can be derived.

12 Claims, 5 Drawing Sheets

U.S. PATENT DOCUMENTS

| | | | |
|---|---|---|---|
| 2006/0236061 A1 | 10/2006 | Koclanes | |
| 2007/0019754 A1 | 1/2007 | Raleigh et al. | |
| 2007/0033273 A1* | 2/2007 | White et al. | 709/223 |
| 2007/0083509 A1 | 4/2007 | Wu et al. | |
| 2007/0140374 A1 | 6/2007 | Raleigh et al. | |
| 2008/0125045 A1 | 5/2008 | Nakao | |
| 2008/0133982 A1 | 6/2008 | Rawlins et al. | |
| 2008/0183090 A1 | 7/2008 | Farringdon et al. | |
| 2009/0216821 A1 | 8/2009 | Nakamura et al. | |

OTHER PUBLICATIONS

"An AI Perspective on Autonomic Computing Policies", Policies for Distributed Systems, Networks, 2004 by J.O. Kephart and W.E. Walsh.

"A Goal-based Approach to Policy Refinement", Proceedings 5th IEEE Policy Workshop (Policy 2004) by A.K. Bandara, E.C. Lupu, J. Moffett, A. Russo.

"Reinforcement Learning: A Survey", Journal of Artificial Intelligence Research, vol. 4, 1996 by L.P. Kaelbling, M. Littman, A. Moore.

"Singular Value Factorization." §3.2.7 in *Numerical Linear Algebra for Applications in Statistics*. by Gentle, J. E. Berlin: Springer-Verlag, pp. 102-103, 1998.

Kwok et al., "An autonomic problem determination system using adaptive multi-levels dictionaries and singular value decomposition techniques", International Journal of Autonomic Computing, vol. 1, No. 1, 2009, pp. 50-57.

Chan et al., "Adaptive Multi-levels Dictionaries and Singular Value Decomposition Techniques for Autonomic Problem Determination", Fourth International Conference on Autonomic Computing, 2007, 2 pages.

Chan et al., "Autonomic ranking and selection of web services by using single value decomposition technique", IEEE International Conference on Web Services, 2008, pp. 661-666.

Chan et al., "A Policy-based Management System with Automatic Policy Selection and Creation Capabilities by using Singular Value Decomposition Technique", IBM Thomas J. Watson Research Center, 19, Skyline Drive, Hawthorne, NY 10532, Proceedings of the Seventh IEEE International Workshop on Policies for Distributed Systems and Networks, 2006, 4 pages.

* cited by examiner

FIG. 2

Events for antecedent terms

Policy actions (consequent terms) 75

|    | P1 | P2 | P3 | P4 | P5 |
|----|----|----|----|----|----|
| E1 | 1  | 1  |    | 1  |    |
| E2 | 1  |    |    | 1  |    |
| E3 |    |    |    |    | 1  |
| E4 |    | 1  |    |    |    |
| E5 |    | 1  | 1  |    |    |
| E6 | 1  |    |    |    | 1  |
| E7 |    |    | 1  |    |    |
| E8 | 1  |    |    |    |    |
| E9 |    |    |    |    | 1  |

Antecedent Events/Policy Actions Matrix

| -0.65 | -0.23 | -0.17 | 0.28  | 0.18  |
|-------|-------|-------|-------|-------|
| -0.48 | 0.09  | -0.36 | -0.22 | 0.44  |
| -0.09 | 0.33  | 0.43  | 0.15  | 0.25  |
| -0.16 | -0.33 | 0.18  | 0.5   | -0.25 |
| -0.21 | -0.56 | 0.48  | -0.15 | -0.07 |
| -0.40 | -0.46 | 0.28  | -0.11 | 0.37  |
| -0.04 | -0.23 | 0.29  | -0.67 | 0.18  |
| -0.29 | 0.13  | -0.15 | -0.27 | -0.62 |
| -0.09 | 0.33  | 0.43  | 0.15  | 0.25  |

Left singular vectors (gene coefficient vectors), with dimension factor K = 2, the first 2 columns are used.

| -0.74 | 0.25  | -0.25 | -0.30 | -0.47 |
|-------|-------|-------|-------|-------|
| -0.41 | -0.61 | 0.3   | 0.56  | -0.19 |
| -0.1  | -0.43 | 0.47  | -0.74 | 0.14  |
| -0.46 | -0.07 | -0.33 | 0.04  | 0.81  |
| -0.23 | 0.61  | 0.7   | 0.17  | 0.19  |

Right singular vectors (expression level vectors) with dimension factor K = 2, the first two columns are used.

S Matrix contains the square roots of the singular values ordered from greatest to least along its diagonal (mode amplitudes); with dimension factor K = 2, the largest 2 values are used.

2 dimensional (k=2) events for antecedent terms and policy actions (consequent terms) Space

US 7,996,353 B2

POLICY-BASED MANAGEMENT SYSTEM WITH AUTOMATIC POLICY SELECTION AND CREATION CAPABILITIES BY USING SINGULAR VALUE DECOMPOSITION TECHNIQUE

CROSS REFERENCE TO RELATED APPLICATION

This application is a continuation of U.S. application Ser. No. 11/446,761 filed Jun. 5, 2006, the entire contents of which are incorporated herein by reference.

FIELD OF THE INVENTION

The present invention relates generally to on-demand and autonomic computing systems in IT systems and environments generally, including those computing systems that are managed by a policy-based management system. The invention particularly relates to a novel system and method by which policies can be selected or created automatically based on events observed and knowledge learned. This new approach treats the observed event-policy relationship represented by an event-policy matrix as a statistical problem that can be yield results using a Singular Value Decomposition (SVD) technique.

DESCRIPTION OF THE PRIOR ART

On demand and autonomic computing, such as described in the reference authored by J. O. Kephart and D. M. Chess entitled "The Vision of Autonomic Computing". IEEE Computer Magazine, January 2003, require policy-based management systems to be responsive to changes in environments and adaptive to new operating conditions. In a typical IT environment, there are thousands of events reporting system faults, status and performance information. New events may also appear due to the on-demand operations, and the occurrences of these events are unpredictable. Traditional policy-based management systems and policy authoring such as relying entirely on static authoring of "if [condition] then [actions]" rules, become insufficient. New approaches to the design and implementation of policy-based systems have emerged, including goal policies such as described in the references entitled "An AI Perspective on Autonomic Computing Policies", Policies for Distributed Systems, Networks, 2004 by J. O. Kephart and W. E. Walsh, and "A Goal-based Approach to Policy Refinement", Proceedings 5th IEEE Policy Workshop (Policy 2004) by A. K. Bandara, E. C. Lupu, J. Moffett, A. Russo. Other new approaches to the design and implementation of policy-based systems have emerged, including utility functions, and data mining and reinforcement learning such as described in the reference entitled "Reinforcement Learning: A Survey", Journal of Artificial Intelligence Research, Volume 4, 1996 by L. P. Kaelbling, M. Littman, A. Moore.

However, it is the case that none of these approaches provides a systematic way to enable policy-based management system and its policies to be responsive to new and ambiguous situations.

It would be highly desirable to provide a statistical approach to the design and implementation of a policy-based management system by utilizing a mathematical technique called Singular Value Decomposition (SVD).

SUMMARY OF THE INVENTION

According to the present invention, there is provided a statistical approach to the design and implementation of a policy-based management system by utilizing a mathematical technique called Singular Value Decomposition (SVD). The SVD technique is closely related to a class of mathematical and statistical techniques, such as eigenvector decomposition, spectral analysis and factor analysis.

Generally, the invention provides a system and method using a statistical approach implementing Singular Value Decomposition (SVD) to a policy-based management system for autonomic and on-demand computing applications. The statistical approach empowers a class of applications that require policies to handle ambiguous conditions and allow the system to "evolve" in response to changing operation and environment conditions. In the system and method providing the statistical approach, observed event-policy associated data, which is represented by an event-policy matrix, is treated as a statistical problem with the assumption that there are some underlying or implicit higher order correlations among events and policies. The SVD approach according to the invention enables such correlations to be modeled, extracted and modified. From these correlations, recommended policies can be selected or created without exact match of policy conditions. With a feedback mechanism, new knowledge can be acquired as new situations occur and the corresponding policies to manage them are recorded and used to generate new event and policy correlations. Consequently, based on these new correlations, new recommended policies can be derived.

Thus, according to one embodiment of the invention, there is provided an adaptive policy-based management system, method and computer program product for computing systems. The adaptive policy-based management system comprises:

a means for representing the occurrences of computer system events and action response policies from computing system resources into a first event-policy data structure;

a means for constructing a second event-policy data structure from the first event-policy data structure, the second event-policy data structure representing an event-policy vector space comprising associative patterns and correlations in the event-policy data;

a means for receiving observed event data set from a computing system resource;

a means for recommending a policy for the observed event data set based on existing policy vectors in the constructed event-policy vector space; and, a means enabling updating of the first event-policy data structure and the second event-policy data structure representing the event-policy vector space as new observed event data sets are received, thereby increasing accuracy in generating recommended policies as new event knowledge is input.

Further to this embodiment of the invention, the adaptive policy-based management system includes a means for storing received observed data event sets and corresponding action response policies from computing system resources.

Moreover, the adaptive policy-based management system her comprises:

an interface means is provided for enabling a user to review and modify a recommended policy for the observed event data set; and, a means for executing a recommended policy and determining a policy's effectiveness for managing the observed event data set, wherein the storing means is updated with the received observed data event sets and corresponding modified response policies.

Further to this embodiment, the means for recommending a policy for the observed event data set comprises: a means for constructing a pseudo-policy vector for an observed event set from data in the event-policy vector space; and, a means for determining a recommended policy based on proximity of the pseudo-policy vector and existing policy vectors included in the event-policy vector space. The means for determining a recommended policy comprises means for applying a similarity metric between the pseudo-policy vector and one or more policy vectors.

Preferably, according to the invention, first event-policy data structure comprises an event-policy matrix, and the means for constructing a second event-policy data structure from the first event-policy data structure comprises means for implementing Singular Value Decomposition (SVD)] function on the event-policy matrix.

According to another aspect of the invention, there is provided a method for policy-based management of computing systems, the method comprising:

representing the occurrences of computer system events and action response policies from computing system resources into a first event-policy data structure;

constructing a second event-policy data structure from the first event-policy data structure, the second event-policy data structure representing an event-policy vector space comprising associative patterns and correlations in the event-policy data;

receiving observed event data set from a computing system resource;

recommending a policy for the observed event data set based on existing policy vectors in the constructed event-policy vector space;

enabling updating of the first event-policy data structure and the second event-policy data structure representing the event-policy vector space as new observed event data sets are received, thereby increasing accuracy in generating recommended policies as new event knowledge is input.

Advantageously, the statistical approach implementing Singular Value Decomposition (SVD) to a policy-based management system for autonomic and on-demand computing applications not only is applicable for traditional policy systems where conditions in policy are fixed, but also is applicable for ambiguous and unpredictable situations. Moreover, the use of a SVD based-policy system and its attendant efficiencies may be implemented for specific areas of autonomic and on-demand computing such as a feedback loop, as a symptom recognition mechanism, and as a predictive mechanism.

The present invention may also be applied to other applications, such as applications for selecting preferred parties or persons (from a space of people) with low risks and/or charging them for low fees, for example, for insurance (auto, life) coverage, as well as loan granting or lending.

BRIEF DESCRIPTION OF THE DRAWINGS

The objects, features and advantages of the present invention will become apparent to one skilled in the art, in view of the following detailed description taken in combination with the attached drawings, in which:

FIG. 2 depicts an example simplified set of security policies 75 that may be illustratively used for demonstrating the policy-based management system of the invention;

FIG. 3 depicts an example left singular vector resulting from Singular Value Decomposition of the event-policy matrix R;

FIG. 4 depicts an example right singular vector resulting from Singular Value Decomposition of the event-policy matrix R;

DESCRIPTION OF THE PREFERRED EMBODIMENTS

Figure 1:
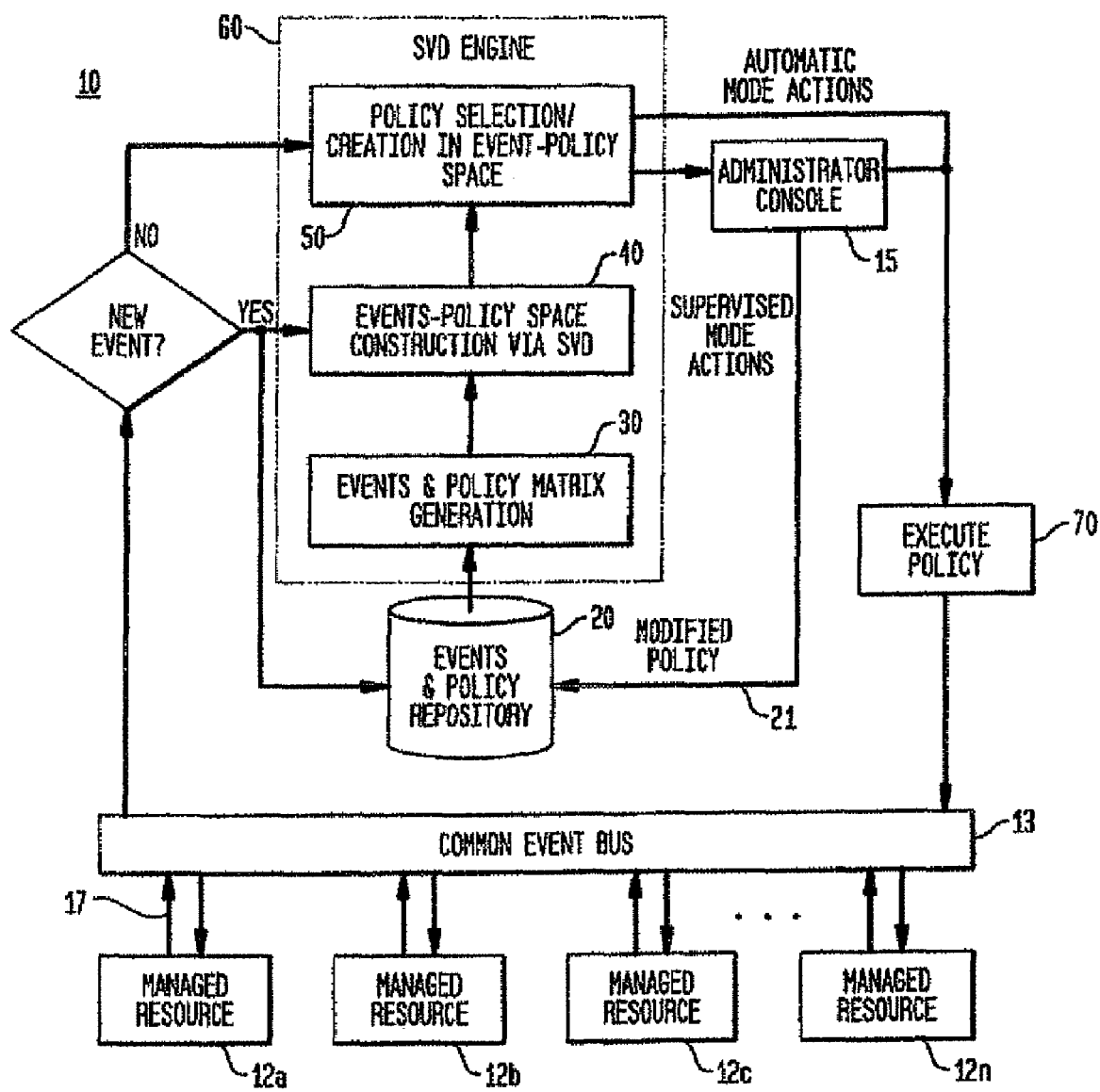
FIG. 1 depicts an example design and architecture of the policy-based management system 10 according to the invention.

FIG. 1 shows the design and architecture of a policy-based management system 10 according to the invention.

As shown in FIG. 1, the system 10 includes an event bus device 13 for event subscription, an administrator console (AC) 15 for administrator actions, an event-policy repository (EPR) 20 for storing event sets and policies, and an SVD engine (SVDE) 60 comprising a number of functional modules as will be explained in greater detail herein below. Events from managed resources (MR) 12a, 12b, . . . , 12n are communicated to the SVDE 50 to the event bus 13 periodically or on an "as needed" basis for analysis to produce a set of "symptoms", describing system status, faults or performance. In a typical data center, for example, there are thousands of different events reporting system faults, status, and performance information and their occurrences are unpredictable. Moreover, new events and conditions also appear as operating environment changes. The communication of such event data to the SVDE may be computer network based, e.g., by transmission over wired or wireless communications links 17 to the event bus. For example, a managed resource 12, e.g., a disk drive, communicates a Common Base Event (CBE) structure or object that holds information about a situation. One example situation may be an indication that the disk drive's capacity is at its maximum. This CBE is placed on the event bus so all components which subscribe to that event type can listen.

As shown in FIG. 1, the SVD engine (SVDE) 60 comprises three (3) modules: an event-policy matrix generation module 30 that executes functions for transforming event sets and their associated policies from the EPR repository 20 into a matrix; an event-policy space construction module 40 that executes functions for decomposing the event-policy matrix utilizing an SVD technique to construct an n-dimensional event-policy space wherein events and policies that are closely associated are placed near one another. One SVD technique in general that may be used according to the invention is described in the reference entitled "Singular Value Factorization." §3.2.7 in *Numerical Linear Algebra for Applications in Statistics*. by Gentle, J. F. Berlin: Springer-Verlag, pp. 102-103, 1998, the whole contents and disclosure of which is incorporated by reference herein; and, a policy selection and/or creation module 50 that executes functions for examining the event-policy space to select or create recommended policies which are closely associated in space with the observed events for remediation.

The AC device 15 provides a user interface (not shown) that enables an administrator or like authorized user to select one of two system operation modes: 1) a supervised mode whereby the administrator is enabled to examine or modify the recommended policy; or 2) an automatic mode, whereby a recommended policy is accepted without further examination. Initially, the system operates in the supervised mode, whereby the administrator examines the event set as problems occur and executes the corresponding policy to correct the problems. The system records the administrator's actions as event-policy data. After enough knowledge (or trust) has been established, the system may be left to operate in an automatic mode. However, should the automatically generated policies fail to perform as the administrator has expected, the administrator or like user may intervene via the AC or revert the system to run in supervised mode.

For ease of illustration and depicting operation of the invention, a simplified set of security policies P1-P5 is shown in FIG. 2 that govern computer usage events generally as indicated as events E1-E9 and, particularly govern user's IP network connectivity. As shown in FIG. 2, the example set of security events and the policies implemented include:
E1=more than 25 failed logins in 5 minutes,
E2=more than 25 logins by a single user/IP,
E3=excessive logins in the entire system,
E4=excessive logins in a domain,
E5=excessive logins in an individual server,
E6=excessive accounts are blocked by security,
E7=excessive FTP connections,
E8=connection established to suspicious IP,
E9=excessive unknown application terminations, and
Action for P1=block IP
Action for P2=block network segment
Action for P3=block sever access
Action for P4=disable account
Action for P5=restrict access to entire system.

Thus, as shown in the example dataset of FIG. 2, there is depicted an Event-Policy Matrix 75 (alternately referred to herein as a correlation matrix) comprising a dataset having m events (Em) and n policies (Pn), where m=9 and n=5. The m events are entered as rows and the n policies are entered as columns in the m×n correlation matrix R. The entries in the event-policy matrix 75 are simply number of occurrences of events in different policies. That is, the entries in the correlation matrix reflect the number of times the corresponding event or circumstances appears in the corresponding policy. It is further understood that the existing policies comprise, or is extracted from, logs or other records of previous actions taken in the system being managed or in other similar systems. It is further understood that if any policy includes the negation of a given event or circumstance, the correlation matrix also contains entries reflecting the occurrence of the negation of each event and/or circumstance in each of the plurality of policies. Moreover, if any policy contains a disjunction between two or more events or circumstances, the correlation matrix also contains entries reflecting the occurrence of that disjunction in each of the plurality of policies.

Figures 5, 6:
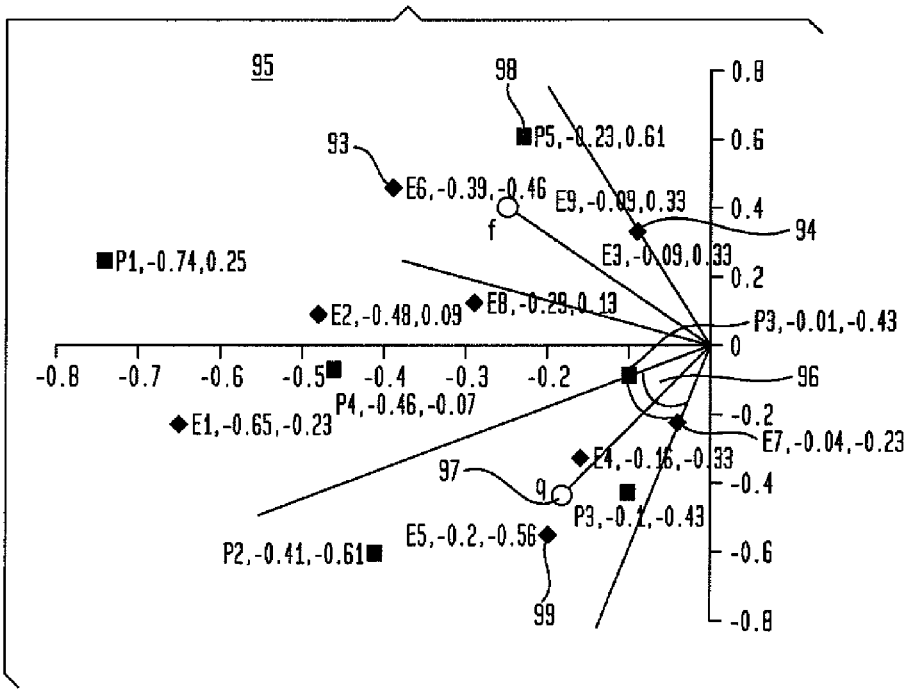
FIG. 5 depicts an example matrix S resulting from Singular Value Decomposition of the event-policy matrix R.
FIG. 6 depicts an example plot of the resulting row vectors of the reduced matrices (shaded columns of the E matrix 80 in FIG. 3 and P' matrix 85 in FIG. 4) that are taken as coordinates of points representing events and policies in an example two-dimensional space.

According to the invention, the matrix R is decomposed into three matrices by SVD technique as in equation (1) as follows:

$$R = E \, S \, P'$$

where E and P' are the event-policy matrices of respective left singular vectors (gene coefficient vectors) and right singular vectors (expression level vectors) with an example left singular vector 82 shown in FIG. 3 and an example right singular vector 87 shown in FIG. 4. As shown in respective FIGS. 3 and 4, left and right singular vectors are both shown having orthogonal columns. FIG. 5 depicts the matrix S 90 which is the diagonal matrix (mode amplitudes) of singular values ordered in decreasing magnitude. According to the invention, these special matrices E, S and P' are the result of a breakdown of the original event-policy relationships such as shown in the data set of FIG. 2 into linearly independent event and policy components. Consequently, each event or policy is represented by a vector. As shown in FIG. 5, the values for many of these singular values can be ignored as they become relatively small. Usually, only the first few largest singular values are needed and the rest deleted. Thus, a reduced model which is approximately equal to the original event-policy model with fewer dimensions can be built. This process, in essence, captures the major relationships among events and policies while ignoring the minor ones by treating them as noise.

In a two dimensional model where k=2 as shown in the shaded elements 82, 87 and 92 in respective FIGS. 3, 4 and 5, all the event to event, policy to policy, and event to policy similarities are now approximated by the first two largest singular values of matrix S 90 of FIG. 5. As a result, the row vectors of the reduced matrices (shaded columns of the E matrix 80 in FIG. 3 and P' matrix 85 in FIG. 4) are taken as coordinates of points representing events and policies in a two-dimensional space 95 as shown in FIG. 6 where events are represented as diamonds, e.g., event E6 93, and policies as squares, e.g., policy P5 98. The dot product or cosine between two vectors representing any two components corresponds to their estimated similarity. It is understood that in the example provided, while the number of orthogonal factors "k" used in the example reduced model is chosen to be two to represent a 2-dimensional space, it is understood that the representation of a conceptual space for any large policy collection usually requires a fairly large number of orthogonal factors. For example, with k approximately 0.6, the smaller of m or n, where m and n are the dimensions of event and policy vectors respectively, would give a good representation with estimation.

Figure 7:
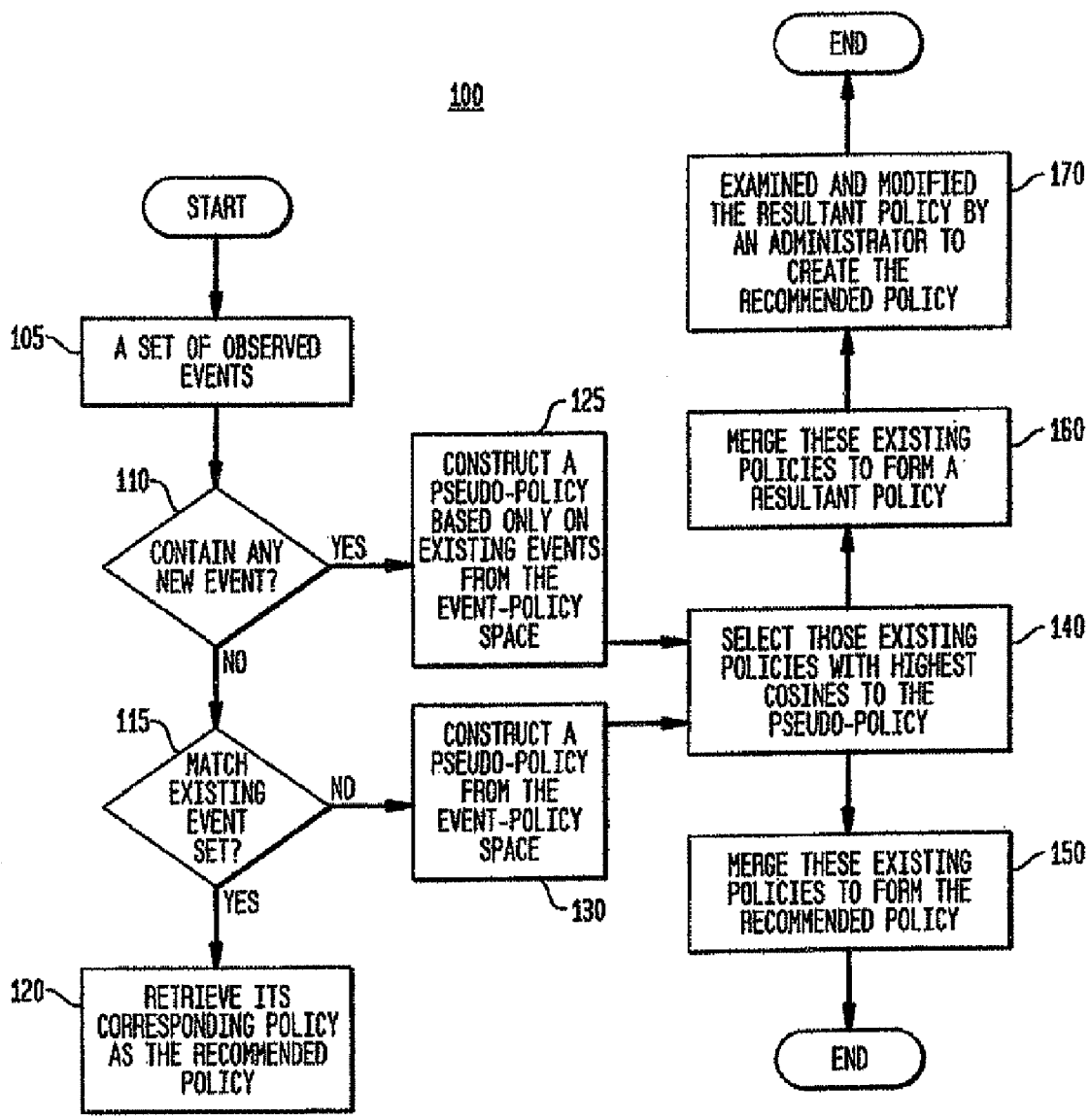
FIG. 7 depicts an example flow chart 100 representing the method steps employed for selecting and/or creating a recommended policy based on a set of observed events; and, FIG. 8 depicts a flow diagram illustrating the interaction of an administrator with the system 10 to examine, modify and create recommended policy.

The ability to select and/or create a policy based on a new set of events as enabled by the present invention is now described with respect to FIG. 7. FIG. 7 depicts an example flow chart 100 representing the method steps employed for selecting and/or creating a policy based on a new set of observed events that are received as input via the CBE as indicated at step 105. At step 110, a determination is made as to whether an event of the observed events set is a new event. If it is determined at step 110 that an event of the observed events set does not include a new event, then the process proceeds to step 115 where a determination is made as to whether the observed events set matches one or more existing event sets as held in the repository. If an observed event set matches one or more of the existing event sets, the system simply retrieves its corresponding policy from the event-policy repository 10 (FIG. 1) as indicated at step 120. Returning to step 110, if an event of the observed events set includes a new event, then the process proceeds to step 125 where the policy selection and creation mechanism in the event-policy space is invoked to construct a pseudo-policy based only on the existing events from the event policy space. However, when a new set of events occurs without any individual new event, as result of the determination made at step 115, the policy selection and creation mechanism in the event-policy space is invoked at step 130. Particularly, at steps 125 and 130, functions are executed in the policy selection and/or creation module 50 of FIG. 1 for examining the event-policy space to select or create recommended policies. Thus, at steps 125 or 130, using the new observed event set, a pseudo-policy is first constructed as the weighted sum of its constituent event vectors. With appropriate rescaling of both the event and policy axes, this amounts to placing the pseudo-policy at the centroid of its corresponding event points. Then, this pseudo-policy is compared against all existing policies by calculating the cosine between the pseudo-policy vector and the existing policy vector as a similarity metric. As a result of vector comparison cosine calculations, those policies with the highest cosines (the nearest vectors) to the pseudo-policy are selected as shown at step 140 in FIG. 7. Their policy actions are appropriately merged at step 150 to form the recommended policy. It is understood that the choice of the threshold cosine value plays a significant role in the number and the accuracy of the policies selected. One technique that may be implemented would be to first use a small cosine value to enable a broader search space initially, and reduce the search space gradually as more data is accumulated to maximize accuracy.

In an alternate embodiment, referring back to FIG. 7, after a result of vector comparison cosine calculations and selection of those policies with the highest cosines (the nearest vectors) to the pseudo-policy as shown at step 140, those policy actions are appropriately merged at step 160 to form a resultant vector. Then, proceeding from step 160, an administrator or like authorized user may examine and modify the resultant policy to create the recommended policy as indicated at step 170. Thus, referring back to FIG. 6 depicting the 2-dimensional plot 95 of Es and Ps, when an observed event set includes at least one new event, the system only uses the existing events to form the pseudo-policy and selects the recommended policy. However, this recommended policy must be examined by the administrator regardless of what operation mode the system is currently in. The administrator, at his/her discretion, may accept, modify or add new actions to this recommended policy via the administrator console 15 of FIG. 1. The recommended policy, whether modified or not by the Administrator) will be executed to determine its effectiveness for the corresponding event set as indicated at block 70, FIG. 1. Upon successful execution of the recommended policy, the new events and actions are fed back from the Administrator Console 15 via feedback loop 21 to the event-policy repository 20 where it will be recorded. After receiving the new event policy entry at the repository, the SVDE 60 is triggered to re-construct a new event-policy space for subsequent uses. As a result, new knowledge is acquired.

Figure 8:
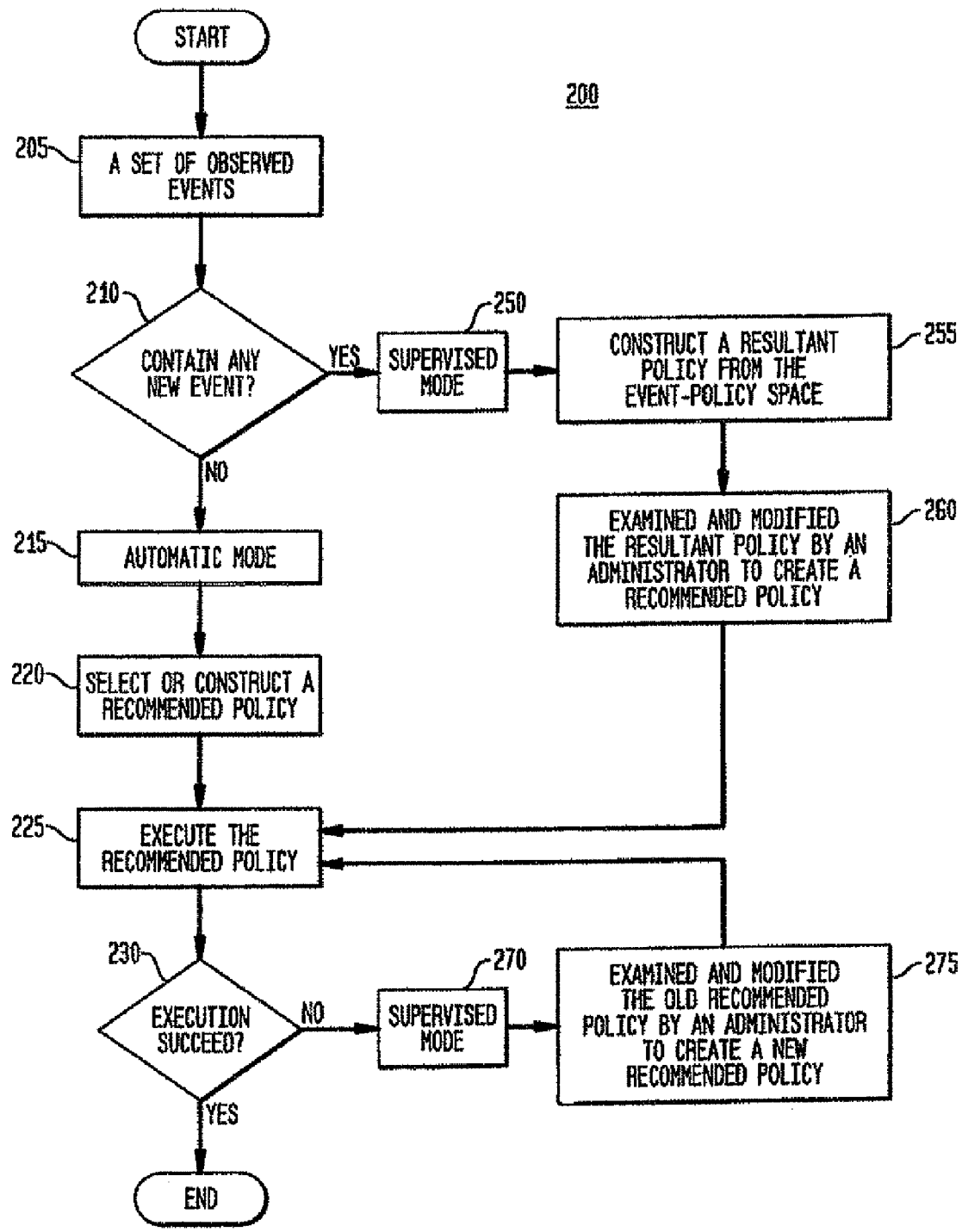

FIG. 8 is a flow diagram 200 illustrating the interaction of an administrator with the system to examine, modify and create recommended policy. As shown in FIG. 8, at a first step 205, the system receives a set of observed events. At step 210, a determination is then made as to whether a new event is included in the observed event set. If no new event is present in the observed event set, then the process proceeds to step 215 where the system is placed in an automatic mode. The process then proceeds to step 220 which represents the step of selecting or constructing a recommended policy as described in detail with respect to FIG. 7. The recommended policy is then executed as depicted at step 225. After execution of the recommended policy, a determination is made at step 230 to determine whether the recommended policy was successfully executed. If the policy was successfully executed, then the process terminates. Referring back to step 210, if it has been determined that a new event is included in the observed event set, then the process proceeds to step 250, FIG. 8, where the system is placed in a supervised mode of operation. Thereafter, at step 255, a resultant policy is constructed from the event-policy space as explained herein with respect to FIG. 7. Then, continuing to step 260, the resultant policy is examined and potentially modified by the administrator in order to create a recommended policy. Referring back to step 230, FIG. 8, if it is determined that the recommended policy was not successfully executed, then the system is placed in a supervised mode of operation as indicated at step 270. In this mode, as indicated at step 275, the old recommended policy is examined and potentially modified by the administrator in order to create a new recommended policy.

An illustrative example is now provided for generating a recommended policy based on a set of observed events is now provided. Specifically, for the example event-policy matrix 75 depicted in FIG. 2, an example embodiment of the invention is now described. In a first example, with k 2 and a threshold cosine value of 0.7, an example observed event set consists of E2 and E3, a direct match of P2 is found; thus, the system simply applies P2 as the recommended policy. However, according to the invention, relevant policies can be further retrieved depending on their proximity to the pseudo policy formed by E2 and E3, despite the fact that an exact match is found. This is useful in the case that the application needs to cover a broader spectrum of recommended policies.

In a further example, an observed event set consists of E4 and E5; a search indicates that there is no matching policy in the current repository. A pseudo-policy Ps is constructed from E4 and E5, represented as point "q" as shown in the two-dimensional event-policy space plot 95 generated as depicted in FIG. 6 which is the centroid of vector E4 97 and E5 99. Policies P2, P3 are selected as they are within the dotted cone 96 with a cosine value of 0.7 from plotted point "q".

In still a further example, an observed event set consists of E6 93, E9 94 and, a new event E10 (excessive external traffic). The system uses E6 and E9 to form the pseudo policy represented as point "f" as shown in FIG. 6. Using a cosine value of 0.7 from plotted point "f", policy P5 is selected as the recommended policy. As in the example policy matrix described hereinabove with respect to FIG. 2, the action of policy PS is to restrict system access for only critical missions. An administrator examines P5, and due to the external threat of system attacks indicated by E10, he adds an action A6, e.g., issue a red security alert action, to the recommended policy. Upon successful execution, this new policy, now named P6, with actions A5 and A6, events E6, E9 and E10 are recorded. Subsequently, the SVDE is triggered to re-construct the event-policy space for subsequent uses.

Advantageously, the statistical approach implementing Singular Value Decomposition (SVD) to a policy-based management system for autonomic and on-demand computing applications not only is applicable for traditional policy systems where conditions in policy are fixed, but also is applicable for ambiguous and unpredictable situations. Moreover, the use of a SVD based-policy system and its attendant efficiencies may be implemented for specific areas of autonomic and on-demand computing such as a feedback loop, as a symptom recognition mechanism, and as a predictive mechanism.

The present invention may be applied to other applications, such as applications for selecting preferred parties or persons (from a space of people) with low risks and/or charging them for low fees, for example, for insurance (auto, life) coverage, as well as loan granting or lending.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

The invention claimed is:

1. An adaptive policy-based management system for computing systems comprising:
    a means for representing the occurrences of computer system events and action response policies from computing system resources into a first event-policy data structure;
    a means for constructing a second event-policy data structure from said first event-policy data structure, said second event-policy data structure representing an event-policy vector space comprising associative patterns and correlations in the event-policy data;
    a means for receiving observed event data set from a computing system resource;
    a means for recommending a policy for said observed event data set based on existing policy vectors in said constructed event-policy vector space;
    a means for updating of said first event-policy data structure and said second event-policy data structure representing said event-policy vector space as new observed event data sets are received, thereby increasing accuracy in generating recommended policies as new event knowledge is input,
    said means for recommending a policy for said observed event data set comprising:
        a means for constructing a pseudo-policy vector for an observed event set from data in said event-policy vector space; and,
        a means for determining a recommended policy based on proximity of said pseudo-policy vector and existing policy vectors included in said event-policy vector space
    wherein said means for determining a recommended policy comprises means for applying a similarity metric between said pseudo-policy vector and one or more policy vectors, said applied similarity metric including a dot product function, said recommended policy comprising a policy vector based on a resulting dot product value within a threshold value; and,
    wherein more than one policy vectors provide dot product values below said threshold value, said system further comprising means for merging said more policy vectors to form a resultant recommended policy.

2. The adaptive policy-based management system as claimed in 1, further comprising:
    a means for storing received observed data event sets and corresponding action response policies from computing system resources;
    an interface device for enabling a user to review and modify a recommended policy for said observed event data set;
    a means for executing a recommended policy and determining that policy's effectiveness for managing said observed event data set; and,
    if said executed recommended policy is determined effective, updating said storing means with said received observed data event sets and corresponding modified response policies.

3. The adaptive policy-based management system as claimed in 1, wherein said means for constructing a pseudo-policy vector for an observed event data set comprises obtaining a centroid of said event data points in said observed event data set and generating an event vector corresponding to said centroid.

4. The adaptive policy-based management system as claimed in 1, wherein said first event-policy data structure comprises an event-policy matrix, said means for constructing a second event-policy data structure from said first event-policy data structure comprises means for implementing Singular Value Decomposition (SVD)] function on said event-policy matrix.

5. The adaptive policy-based management system as claimed in claim 1, wherein said observed event data set from a computing system resource comprises one or more of system faults, system status or performance information of said resources.

6. The adaptive policy-based management system as claimed in claim 1, wherein said observed event data set includes a new event or new event patterns for which no existing policy matching condition exists.

7. A computer-implemented method for policy-based management of a computing system comprising:
    representing occurrences of a computer system events and action response policies from computing system resources into a first event-policy data structure;
    constructing by said computer system a second event-policy data structure from said first event-policy data structure, said second event-policy data structure representing an event-policy vector space comprising associative patterns and correlations in the event-policy data;
    receiving observed event data set from a computing system resource;
    recommending by said computer system a policy for said observed event data set based on existing policy vectors in said constructed event-policy vector space;
    updating of said first event-policy data structure and said second event-policy data structure representing said event-policy vector space as new observed event data sets are received, thereby increasing accuracy in generating recommended policies as new event knowledge is input;
    said recommending a policy for said observed event data set comprises:
        constructing a pseudo-policy vector for an observed event set from data in said event-policy vector space; and, determining a recommended policy based on proximity of said pseudo-policy vector and existing policy vectors included in said event-policy vector space, wherein said determining a recommended policy comprises: applying a similarity metric between said pseudo-policy vector and one or more policy vectors, said applied similarity metric including a dot product function, said recommended policy comprising a policy vector based on a resulting dot product value within a threshold value; and, wherein more than one policy vectors provide dot product values below said threshold value, said method further comprising: merging said more policy vectors to form a resultant recommended policy.

8. The method as claimed in claim 7, further comprising:

storing, in a data storage device, received observed data event sets and corresponding action response policies from computing system resources;

enabling a user to review and modify a recommended policy for said observed event data set via an interface;

executing a recommended policy and determining a policy's effectiveness for managing said observed event data set; and, if said executed recommended policy is determined effective, updating said storing means with said received observed data event sets and corresponding modified response policies.

9. The method as claimed in claim 7, wherein said first event-policy data structure comprises an event-policy matrix, said constructing a second event-policy data structure from said first event-policy data structure comprises implementing a Singular Value Decomposition (SVD)] function on said event-policy matrix.

10. A program storage device tangibly embodying software instructions for execution by a computing device to perform a method for policy-based management of computing systems according to claim 7.

11. A computer-implemented method for creating new policies for automated decision-making in a computing system, the method comprising:

creating by a computer system a correlation matrix having entries reflecting the correlation, in a set of existing policies, between a plurality of events and a plurality of policies;

determining existence of a match between an observed set of events against the entries in the correlation matrix, and, if there is no exact match between the observed set of events and the entries in said correlation matrix, then, utilizing a singular-value decomposition (SVD) technique for constructing a new policy responsive to the observed set of events and the correlation matrix, said SVD technique generating an event-policy vector space comprising associative patterns and correlations in the event-policy data;

said constructing a new policy for said observed event data set comprising:

constructing a pseudo-policy vector for an observed event set from data in said event-policy vector space, and, determining a recommended policy based on proximity of said pseudo-policy vector and existing policy vectors included in said event-policy vector space, wherein said constructing a new policy comprises:

applying a similarity metric between said pseudo-policy vector and one or more said existing policy vectors, said applied similarity metric including a dot product function, a constructed policy comprising a policy vector based on a resulting dot product value within a threshold value; and, wherein more than one policy vectors provide dot product values below said threshold value, said method further comprising: merging said more policy vectors to form a resultant recommended policy.

12. The method as in claim 11, further comprising: updating the correlation matrix to include the newly-constructed policy.

* * * * *